United States Patent [19]

Heys, Jr. et al.

[11] Patent Number: 4,698,707

[45] Date of Patent: Oct. 6, 1987

[54] PROTECTIVE COVER FOR HOUSING FOR DATA PROCESSING MECHANISM

[75] Inventors: George Heys, Jr.; Rex A. Aleshire; Harold J. Sampson, all of Cambridge, Ohio

[73] Assignee: NCR Corporation, Dayton, Ohio

[21] Appl. No.: 787,356

[22] Filed: Oct. 15, 1985

[51] Int. Cl.⁴ .................... G11B 5/016; G11B 5/012; A47B 81/00; A47G 19/26
[52] U.S. Cl. ........................................ 360/99; 360/98; 360/97; 360/105; 369/71; 312/284
[58] Field of Search ..................... 360/97–99, 360/133, 105; 369/71; 312/284

[56] References Cited

U.S. PATENT DOCUMENTS

| | | | |
|---|---|---|---|
| 3,340,441 | 9/1967 | Probert | 317/120 |
| 3,598,465 | 8/1971 | Schmid et al. | 312/284 |
| 3,850,342 | 11/1974 | Dsjuba | 220/331 |
| 3,899,794 | 8/1975 | Brown, Jr. | 360/133 X |
| 3,901,372 | 8/1975 | Denley | 197/186 R |
| 4,002,955 | 1/1977 | Eggert et al. | 317/120 |
| 4,073,000 | 2/1978 | Krejsn | 361/344 |
| 4,142,730 | 3/1979 | Hynd et al. | 360/99 |
| 4,145,096 | 3/1979 | Sitsen et al. | 312/7 TV |
| 4,193,102 | 3/1980 | Beuch et al. | 360/105 X |
| 4,216,510 | 8/1980 | Manzke et al. | 360/97 |
| 4,243,281 | 1/1981 | Egger | 312/208 |
| 4,380,782 | 4/1983 | Hirose et al. | 360/99 X |
| 4,380,783 | 4/1983 | Adamek et al. | 360/99 X |
| 4,396,963 | 8/1983 | Wright | 360/97 X |
| 4,425,014 | 1/1984 | Blepp | 312/284 |
| 4,478,335 | 10/1984 | Long et al. | 206/444 |
| 4,481,552 | 11/1984 | Dona et al. | 360/133 |
| 4,498,583 | 2/1985 | Long et al. | 206/444 |
| 4,530,022 | 7/1985 | Saranella | 360/98 |
| 4,577,249 | 3/1986 | Cantwell | 360/105 |

*Primary Examiner*—John H. Wolff
*Assistant Examiner*—Alfonso Garcia
*Attorney, Agent, or Firm*—Wilbert Hawk, Jr.; Albert L. Sessler, Jr.

[57] ABSTRACT

A protective cover for electronical equipment such as a magnetic disk read-record unit includes a hinged cover element having sealing surfaces disposed on the edges thereof to prevent pollutants from being drawn into the electronic equipment, and also includes an actuator on the exterior of the cover which extends therethrough and cooperates with a mating element on the housing of the electronic equipment when said cover element is closed, to effect latching of the cover element in place and operation of the electronic equipment when said actuator is operated.

18 Claims, 9 Drawing Figures

PROTECTIVE COVER FOR HOUSING FOR DATA PROCESSING MECHANISM

BACKGROUND OF THE INVENTION

Difficulty has been encountered in operating electronic equipment in an environment containing airborne pollutants. More specifically, certain equipment such as a magnetic storage disk read/record unit, may encounter reliability and life problems in certain environments such as a manufacturing plant, for example, because of the necessity for providing an opening in the equipment housing for loading and removal or replacement of magnetic storage disks which may contain data base information, programs, etc. The problem is aggravated in some instances by the need to use equipment cooling fans to dissipate excessive heat generated by operation of the equipment. The air drawn into the equipment through the opening for the disk by the fan may contain pollutants which will cause damage to components such as the read/write head and the storage media. Closing of the disk opening by a movable cover permits an arrangement in which air circulation is directed through another opening provided with a filter which is capable of removing most of the pollutants.

It is known to provide a cover for magnetic disk units which form a part of a business terminal, as shown, for example, in copending U.S. patent application Ser. No. 749,358, filed June 27, 1985 now U.S. Pat. No. 4,636,781, issued Jan. 13, 1987, inventors David C. Wills et al., assigned to the assignee of the present application.

SUMMARY OF THE INVENTION

This invention relates to a protective cover, and more particularly relates to a movable cover for a mechanism which can be opened to permit access to said mechanism and closed to substantially seal said mechanism against the introduction of pollutants.

In accordance with one embodiment of the invention, a protective cover for a mechanism housing comprises a cover element movable between an open position and a closed position in which said cover element covers one portion of said housing; hinge means for hinging one edge of said cover element to said housing; operating means mounted on said one portion of said housing and operable to operate mechanism within said housing; actuating means mounted on said cover element and engageable with said operating means when said cover element is in closed position; and latch means coupled to said operating means; whereby when said cover element is closed, movement of said actuating means causes said operating means to operate mechanism within said housing and also causes said latch means to retain said cover element in closed position.

It is accordingly an object of the present invention to provide a protective cover for a mechanism housing.

A further object is to provide a protective cover for a mechanism housing which is movable between an open position in which access to the mechanism is provided and a closed position in which the mechanism is substantially sealed against air-borne pollutants.

A further object is to provide a movable protective cover for a mechanism housing in which an actuator on said cover coacts with a mating element when the cover is in a closed position, so that the actuator, when operated, latches the cover in closed position, and operates said mechanism.

With these and other objects, which will become apparent from the following description, in view, the invention includes certain novel features of construction and combinations of parts, a preferred form or embodiment of which is hereinafter described with reference to the drawings which accompany and form a part of this specification.

DETAILED DESCRIPTION OF THE PREFERRED EMBODIMENT

Figure 1:
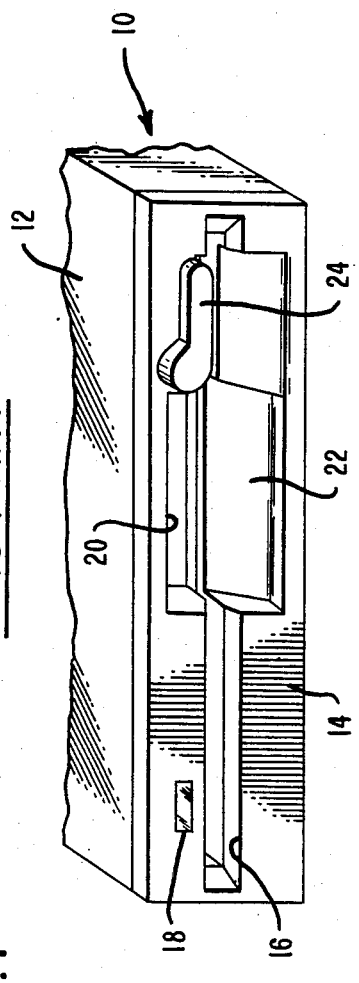
FIG. 1 is a perspective view of a typical prior-art magnetic disk read-record unit.

Referring now to FIG. 1 of the drawings, shown there is a partial view of prior art apparatus 10, which may be, for example, a magnetic disk read-record unit. Such unit includes an external housing 12, together with internal mechanism and electronic circuitry. One end 14 of the housing includes a wide slot 16 through which a magnetic disk (not shown) may be introduced into the unit and retrieved therefrom. An indicator 18 is illuminated when power is applied to the unit 10. Cutaway portions 20 and 22 of the end 14 are provided to facilitate grasping of the disk. A handle 24 is provided to initiate operation of the unit 10. The unit 10 shown in FIG. 1 is compact and easy to use, but suffers from the disadvantage that airborne impurities can readily find their way to the interior of the unit through the slot 16 and can thereby adversely affect the life and reliability of components within the unit.

Figure 8:
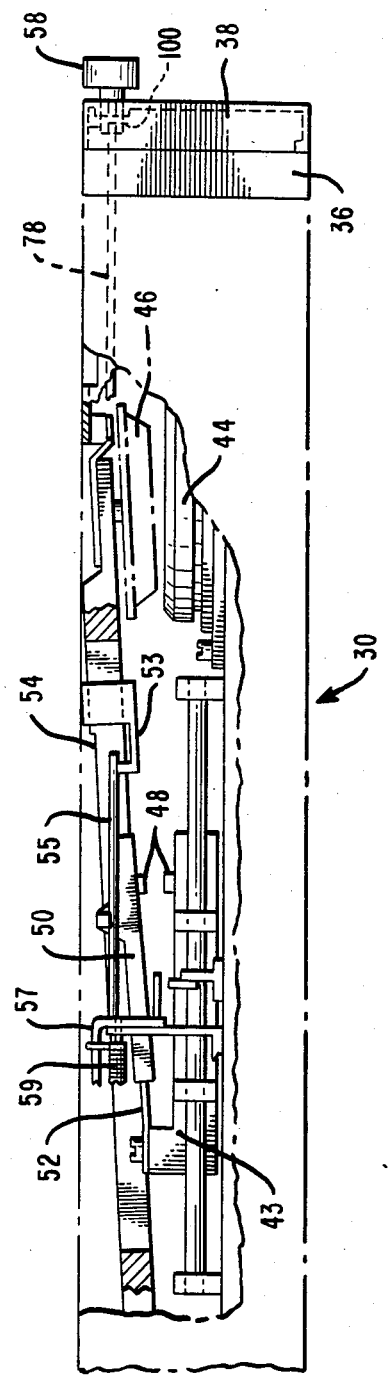
FIG. 8 is a fragmentary sectional view taken on line 8—8 of FIG. 2.
Figure 2:
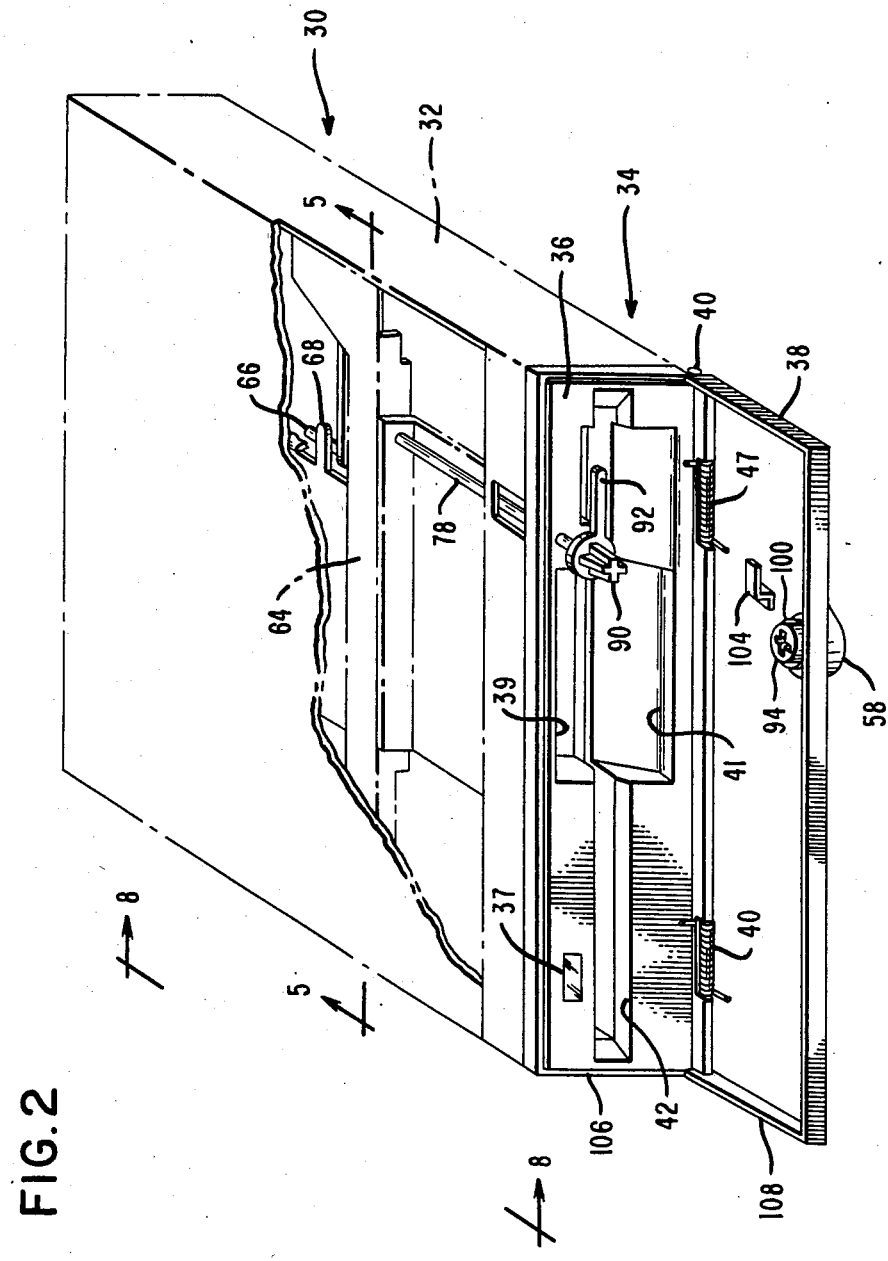
FIG. 2 as a partial perspective view showing a protective cover operatively associated with a magnetic disk read record unit.
Figure 3:
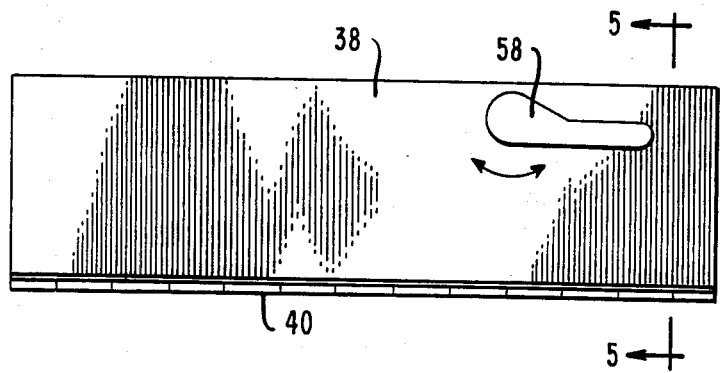
FIG. 3 is an end view of the protective cover in a closed position.
Figure 4:
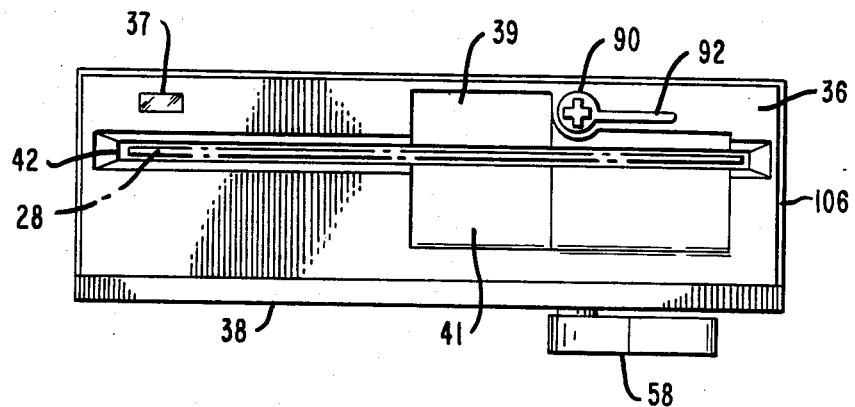
FIG. 4 is an end view of the protective cover in an open position.
Figure 5A:
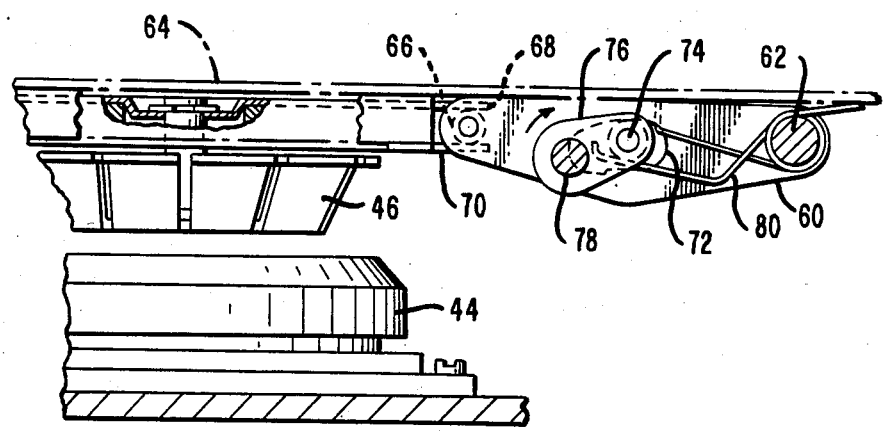
FIG. 5A, taken along line 5—5 of FIG. 2, is a fragmentary sectional view of the electronic apparatus associated with the protective cover with operating mechanism thereof in a first position.
Figure 5B:
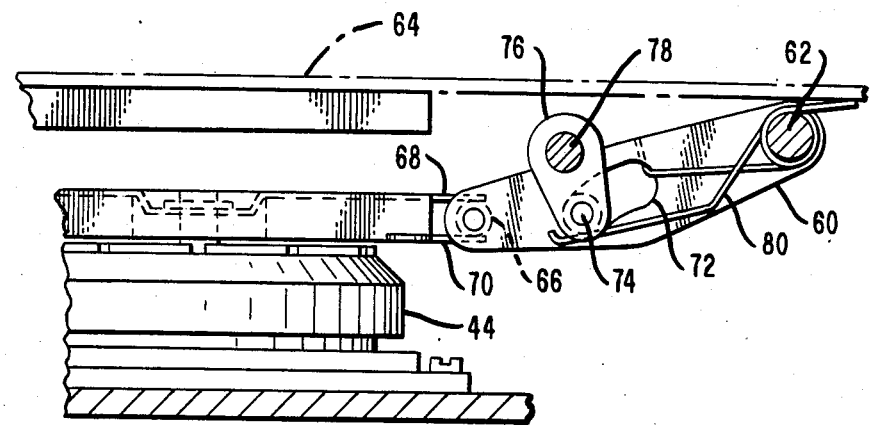
FIG. 5B is a view similar to FIG. 4A, showing operating mechanism of the electronic apparatus in a second position.
Figure 6:
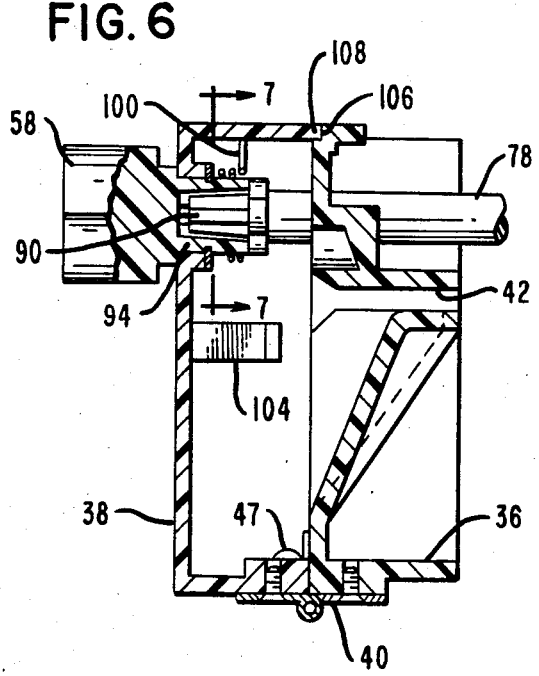
FIG. 6 is a fragmentary sectional view showing the protective cover in a closed position and the actuator thereon engaged with a mating element of the electronic apparatus.

Shown in FIG. 2 is a partial perspective view of an apparatus such as a magnetic disk read-record unit 30 which embodies the present invention. This unit includes an external housing 32, together with internal mechanism and electronic circuitry. The end 14 of the housing of the prior art unit 10 is replaced with a multi-element protective cover shown generally as 34 which includes an end plate 36 attached to the unit 30 and a lid or cover 38 attached to the end plate 36 by hinges 40. Springs 47 urge the cover 38 to an open position. An indicator 37 in the plate 36 is illuminated when power is applied to the unit 30. The end plate 36 contains a wide slot 42 similar to the slot 16 of FIG. 1 through which a magnetic disk 28 (FIG. 4) may be introduced into the unit 30 and withdrawn therefrom. Cutaway portions 39 and 41 are provided to facilitate grasping of the disk 28. As best shown in FIGS. 5A, 5B and 8, the internal mechanism includes cooperating turntable elements 44 and 46 for receiving and rotating the disk 28, and read-record heads 48 for reading and recording information from and on the disk 28. The heads 48 are mounted on a carriage 43 for radial movement with respect to the disk 28 to enable said heads to interact with all areas of the disk. The upper head 48 is mounted on an arm 50, and is urged by a spring 52 into operative position with respect to the disk 28. The upper turntable element 46 is mounted on an arm 54, which may be raised to permit insertion and removal of the magnetic disk 28 within the unit 30. When the arm 54 is raised, an extension 53 thereon engages a bar 55 on an arm 57 which is pivotally mounted on the frame 64 and urged downwardly by a spring 59. The bar 55 engages a projection 56 on the arm 50, to hold the upper read-write head 48 out of operative relation with the recording surface of said disk 28.

Movement of the arm 54 is manually controlled from outside of the unit 30 by a human operator through movement of a handle 58, as will subsequently be described in greater detail. A lever 60 (FIGS. 5A and 5B) which is pivotally mounted adjacent one end thereof at 62 on the frame 64 of the unit 30 has fixed to the other end thereof a stud 66, which is retained between two extensions 68 and 70 on one side of the arm 54. A "peanut" shaped opening 72 is contained in the central portion of the lever 60, and receives a rod 74, which is in turn secured to one end of an arm 76, the other end of which is fixed to one end of a shaft 78 journalled in the frame 64 of the unit 30. The other end of the shaft 78 extends through the end plate 36. An over-center spring 80 is positioned to maintain the rod 74 adjacent one or the other of the two ends of the "peanut" shaped opening 72, thus holding the upper turntable element 46 in the selected one of its two extreme upper or lower positions.

Figure 7:
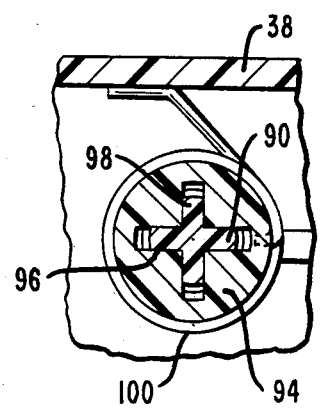
FIG. 7 is a fragmentary sectional view taken on line 7—7 of FIG. 6.

The end of the shaft 78 which extends through the plate 36 has secured thereto a splined male element 90, of generally conical configuration, to which is fixed an elongated latch 92. A complementary female element 94 is rotatably mounted in the cover 38 in a location to engage the male element 90 when the cover 38 is in closed position. Slots 96 in the element 94 receive splines 98 on the element 90 to cause the element 90 to be rotated by the element 94. As best shown in FIG. 7, a spring 100 is anchored in the element 94 and has an end engaging an inner surface of the cover 98 to cause the element 94 to be rotationally positioned so that the slots 96 are in alignment with the splines 98 during closing movement of the cover 38.

The handle 58 is formed integrally with the external portion of the element 94 and may be grasped by a human operator for rotation of the elements 90, 94 and the shaft 78.

A hook member 104 is positioned on the inside surface of the cover 38, so that rotation of the coupled male and female elements 90, 94 causes the latch 92 to engage the hook member 104 to retain the cover 38 in closed position.

Complementary sealing surfaces 106 and 108 on the plate 36 and cover 38, respectively, coact to substantially seal said plate and cover together when the cover is closed and latched, thereby halting or severely limiting the flow of air from the slot 42 through the unit 30, and thus minimizing damage to the unit through air-borne pollutants. The complementary surfaces 106 and 108 may be molded integrally with the plate 36 and cover 38, which may, for example, be of a suitable plastic material.

In operation, it will be seen that with the cover 38 open, a disk 28 may be inserted into, or removed from, the unit 30 through the slot 42. At this time, the turntable elements 44 and 46 are separated to permit introduction of the disk 28, and the read-record head 48 is held out of engagement with disk 28 by engagement of the projection 56 with the arm 54. When the disk 28 is in position on the turntable comprising the elements 44 and 46, the cover 38 is closed, bringing the element 94 into engagement with the element 90. Operation of the handle 102 causes the element 94 to rotate the element 90 and the shaft 78, causing the latch 92 to engage the hook member 104 to retain the cover 38 in closed position, and also causing the shaft 78 to act through the arm 76, the rod 74, the lever 60, the stud 66 and the arm 54 to cause the upper turntable element 46 to engage the disk 28. Lowering of the arm 54 also permits the upper read-record head 48 to move into operative position with respect to the disk 28.

A reading or recording operation of the disk 28 can then take place. When the operation is completed, the handle 102 is rotated in the opposite direction to release the latch 92 from the hook member 104 and thus to permit the cover 38 to be opened. At the same time, the turntable elements 44, 46 are caused to be separated, and the upper read-record head 48 is caused to be moved out of operative relation to the disk 28. The disk 28 can then be removed from the unit 30 through the slot 42. If desired, the cover may then be closed and latched until the unit 30 is used again.

It may be noted that to the extent that air flow is required through the unit 30 for cooling, this air may be brought in from outside by a fan or other means throuqh a suitable opening (not shown) in the housing 32. Such an opening can be readily provided with a suitable filter to eliminate or substantially reduce polluting or contaminating air-borne elements.

While the form of the invention shown and described herein is admirably adapted to fulfill the objects primarily stated, it is to be understood that it is not intended to confine the invention to the form or embodiment disclosed herein, for it is susceptible of embodiment in various other forms within the scope of the appended claims.

What is claimed is:

1. A protective cover for a housing for a data processing mechanism comprising:

a cover element movable between an open position and a closed position in which said cover element covers one portion of said housing;

hinge means for hinging one edge of said cover element to said housing;

operating means rotatably mounted on said one portion of said housing and operable to control said data processing mechanism within said housing;

manually operable actuating means rotatably mounted on said cover element and only engageable with said operating means when said cover element is in closed position;

latch means fixed to said operating means and rotatable therewith; and latch receiving means fixed to the inner surface of said cover element for engaging said latch means;

whereby when said cover element is closed, manual movement of said actuating means causes said operating means to control said data processing mechanism within said housing and concurrently also causes said latch means to retain said cover element in closed position.

2. The protective cover of claim 1, in which complementary surfaces of said portion of said housing and said cover element form a seal when said cover element is closed, for protection of said mechanism against airborne impurities.

3. The protective cover of claim 1, in which said operating means comprises a splined male element adapted to engage with a portion of said actuating means to be rotated thereby.

4. The protective cover of claim 3, in which said actuating means includes a slotted female portion adapted to engage the splined male element of the operating means to rotate said operating means when said actuating means is rotated.

5. The protective cover of claim 1, in which said actuating means includes a handle portion positioned externally of said cover element, whereby said actuating means may be manually rotated.

6. The protective cover of claim 5, also including positioning means to hold said actuating means in proper rotational position to engage said operating means as said cover element is moved from open to closed position.

7. The protective cover of claim 6, in which said positioning means is a coil spring disposed around said actuating means adjacent the inner surface of said cover element, and engaging said cover element and said actuating means.

8. The protective cover of claim 1, also including spring means normally urging said cover element to an open position.

9. The protective cover of claim 1, in which said latch means includes an elongated arm which extends outwardly from said operating means and which is movable therewith to engage said latch receiving means on the inner surface of said cover element when said cover element is in closed position and the actuating means has been operated to operate said data processing mechanism within said housing.

10. A protective cover for a data storage disk mechanism including turntable elements and head elements, comprising:
a front plate disposed at one end of said mechanism and slotted to enable a data storage disk to be placed within said data storage disk mechanism;
a cover element for covering said front plate;
hinge means for hinging the cover element to the front plate along one edge of said cover element to enable said cover element to move between an open position and closed position;
operating means rotatably mounted on said front plate and operable to move said turntable elements and said head elements of said mechanism into and out of closed position with respect to said data storage disk;
first latch means connected to said operating means to rotate therewith for latching said cover element in closed position;
second latch means fixed on the inside surface of said cover element and cooperating with said first latch means to retain said cover element in closed position; and
manually operable actuating means rotatably mounted on the outer surface of said cover element and extending therethrough to operatively engage said operating means only when said cover element is in closed position, whereby rotation of said actuating means with said cover element in closed position operates said data storage disk mechanism to place said turntable elements and said head elements into closed relation to a data storage disk positioned within said mechanism.

11. The protective cover of claim 10, in which complementary peripheral surfaces of said front plate and said cover element form a seal when said cover element is closed, for protection of said mechanism against airborne impurities.

12. The protective cover of claim 10, in which said operating means comprises a splined conical male element adapted to engage with a portion of said actuating means to be rotated thereby.

13. The protective cover of claim 12, in which said actuating means includes a slotted female portion adapted to engage the splined conical male element of the operating means to rotate said operating means when said actuating means is rotated.

14. The protective cover of claim 13, in which said actuating means includes a handle portion positioned externally of said cover element, whereby said actuating means may be manually rotated.

15. The protective cover of claim 13, also including positioning means to hold said actuating means in proper rotational position to engage said operating means as said cover element is moved from open to closed position.

16. The protective cover of claim 15 in which said positioning means is a coil spring disposed around said actuating means adjacent the inner surface of said cover element, and engaging said cover element and said actuating means.

17. The protective cover of claim 10, in which said first latch means is an elongated arm extending outwardly from said operating means and rotatable therewith in a plane parallel to the plane of said front plate, and in which said second latch means is in the configuration of a hook for receiving said arm when the cover element is in closed position and the actuating means has been operated to place said turntable elements and said head elements of said mechanism in closed relation to a data storage disk positioned within the mechanism for a reading or recording operation.

18. The protective cover of claim 10, also including spring means normally urging said cover element to an open position.

* * * * *

UNITED STATES PATENT AND TRADEMARK OFFICE
CERTIFICATE OF CORRECTION

PATENT NO. : 4,698,707

DATED : October 6, 1987

INVENTOR(S) : George Heys, Jr.

It is certified that error appears in the above—identified patent and that said Letters Patent is hereby corrected as shown below:

Column 5, line 5, delete the word "also".

Signed and Sealed this

Eighth Day of March, 1988

Attest:

DONALD J. QUIGG

*Attesting Officer*　　　　　*Commissioner of Patents and Trademarks*